G. A. COLLINS.
LENS AND METHOD OF PRODUCING THE SAME.
APPLICATION FILED JUNE 12, 1916.
1,297,660.
Patented Mar. 18, 1919.
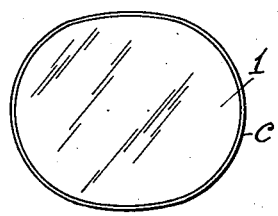
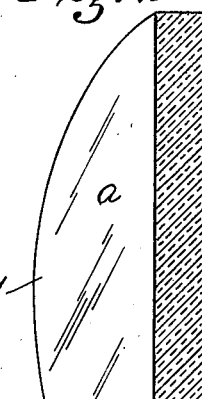
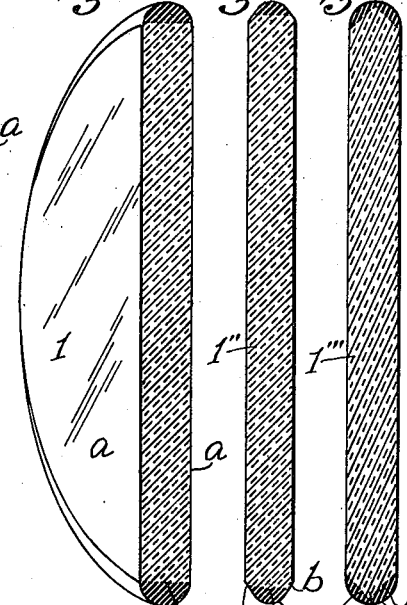
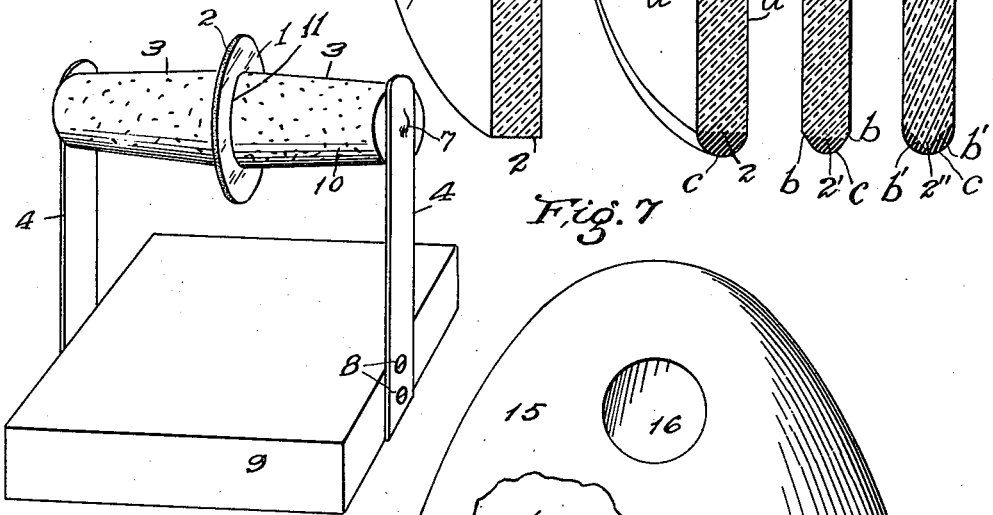
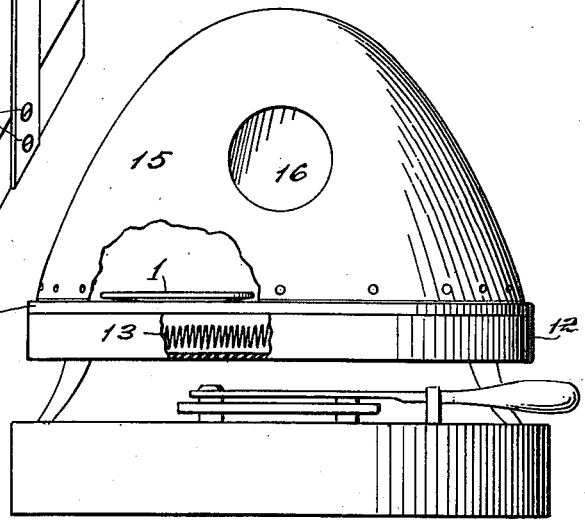
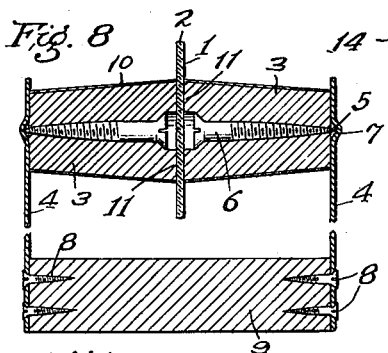
Witness
C. C. Holly
Inventor
George A. Collins
James R. Townsend
his atty

UNITED STATES PATENT OFFICE.

GEORGE A. COLLINS, OF LOS ANGELES, CALIFORNIA, ASSIGNOR OF ONE-HALF TO SIEGFRIED G. MARSHUTZ, OF LOS ANGELES, CALIFORNIA.

LENS AND METHOD OF PRODUCING THE SAME.

1,297,660.

Specification of Letters Patent.   Patented Mar. 18, 1919.

Application filed June 12, 1916. Serial No. 103,587.

*To all whom it may concern:*

Be it known that I, GEORGE A. COLLINS, a citizen of the United States, residing at Los Angeles, in the county of Los Angeles and State of California, have invented and discovered a new and useful Lens and Methods of Producing the Same, of which the following is a specification.

An object of this invention and discovery is to provide a superior lens for eyeglasses and spectacles and the like as well as all similar and other optical purposes.

I regard the discovery and invention as broadly new and basic in that I have produced a practical one-piece lens and rim, thus minimizing the number of pieces going to make up eyeglasses or spectacles.

An object of the invention is to provide an eyeglass or spectacle lens having a superior ornamental finish without the use of metal or rubber bands or rims, or other pieces embracing the margins of the lenses.

A further object is to provide a rimmed lens adapted in a superior manner for screwless mounting.

A further object is to provide a lens which prevents reflection and glare at or from the edges.

A further object is to provide a lens which casts a shade or shadow from the newly protected edges over all or part of the lens and thus protects the eyes in a measure against strong lights; as well as protecting the edge from chipping and breaking.

Other objects, advantages and features of invention may appear from the accompanying drawings, the subjoined detailed description and appended claims.

The discovery and invention may be understood by reference to the accompanying drawings.

Figure 1 is a front view of a finished lens constructed in accordance with this invention.

Fig. 2 is an enlarged perspective section of an unfinished lens prepared to receive enamel to form the rim shown in Fig. 1.

Fig. 3 is an enlarged perspective transverse section of the finished lens shown in Fig. 1.

Figs. 4 and 5 are enlarged sections of other forms of the finished lenses.

Fig. 6 is a perspective view of an unfinished lens and a holder by means of which the workman may hold the lens in the operation of setting the enamel.

Fig. 7 is an axial section of a baking furnace adapted for finishing the lens.

Fig. 8 is a fragmental view in longitudinal section of the lens holder shown in Fig. 6.

This lens is especially adapted for screwless mountings for the reason that it is formed as a homogeneous body comprising two units, one being the transparent lens body and the other being a rim integral therewith formed on the periphery of said transparent body, so that a slot cut into the edge of the lens and its rim to receive the screwless mounting does not effect nor tend to effect a separation between the rim and the lens.

The rim may be of opaque, translucent or transparent material added to and made integral with the transparent body of the lens and may be colored or colorless.

The transparent body 1 of the lens may be of any usual material such as glass, pebble and the like, and is finished in the manner that is usual in finishing a lens preparatory to supplying the same with a rim or mounting excepting that the edges of the lens are not beveled and the transverse traces of the face of the edge 2 are straight and at right angles to the mid-plane of the lens; that is to say, to the plane extending from edge to edge of the lens midway between the front and rear faces thereof, so that the angles between the lens edge and the margins of the front and rear faces of the lens are abrupt.

The edge 2 of the lens has a rough finish, and such finish may be applied to the lens in the ordinary course of shaping the edge of the lens on the stone by the grinder. When the glass body of the lens has thus been prepared its edge and margins are thoroughly cleansed by the use of a suitable cleanser, as for instance, wood alcohol, ammonia or other similar cleansing fluid, preparatory to receiving enamel.

Said enamel may be of any character suitable to be baked in an oven; such for instance as certain paints used by china painters and certain baking enamels used for enameling metal.

An enamel which I have used with marked success belongs to that class of enamels which I understand is made from minerals such as melanite and gilsonite, mineral or mineral pigment from copper, iron, zinc, lead, silver, gold, etc., combined with resinous gums in the form of baking varnishes, together with different thinners used as a vehicle. However, I do not confine the enamel to be used to the kind herein described, as other compositions of enamel may also be applied.

In the process about to be described said thinners are evaporated in a ventilating oven or fired in a kiln under high degrees of heat, thus forming a rim from the enamel surface remaining.

The method of providing the lens with the integral rim is practically as follows:

After the edge of the lens has been thoroughly cleansed as above stated the lens is placed between heat insulating holders 3 that may be of cork, the large ends of which contact with the opposite faces of the lens leaving the margins of the lens free. Said holders may be mounted between the spring arms 4 by means of metal points 5 which may be formed by the tips of screws 6 driven axially through the corks from the larger to the smaller ends and countersunk at the larger ends so that they will not contact with the lens, while the points of the screws project from the smaller ends to form the pivots 5 which may be seated in dents 7 in the spring arms 4. Said spring arms may be made of strips of brass and may be fixed by screws 8 to a base 9.

The corks may have an external coating 10, except at the face 11 of the larger end, and it is deemed desirable that said face should be formed of cork without any coating, thus affording a desirably firm and soft face that will not scratch the lens.

When the lens has been mounted in the holder the workman may by means of a brush apply the thick enamel or paint above referred to, to the edge of the lens and during this process may rotate the lens on the pivots by turning either one of the corks, and consequently, the lens and the other cork; meanwhile holding the edge of the lens above the flame of a Bunsen burner not shown, using gas as fuel. It is not understood that it is material what nature of fuel is employed to supply the heat. The heat thus applied rapidly evaporates the vehicle of the enamel, so that during this one operation the workman may apply several coats one on top of another, thus continuously building up an unbaked baking-enamel rim of superposed layers on the edge of the lens. By using a pointed camel's hair brush or the like the workman will thus build up a rim of the enamel considerably thickened at the center.

In this manner a coating of enamel having a transversely convex surface is applied to the edge of the lens.

When a rounded rim of enamel has thus been applied and set on the lens, said lens is placed in a ventilated baking oven and brought to a temperature of about 250° Fahrenheit, more or less, and is maintained at that temperature as far as possible for a period of one hour, more or less.

After the baking of the enamel has progressed about an hour, the lens will be taken from the oven and the workman will remove from the face of the lens any of the enamel which may have baked thereon. This may be done by means of a brass scraper which will scrape the enamel from the smooth face of the lens without injury to the lens or to its integral rim; it may also be done with any paint remover. The lens is then placed back in the oven to finish baking, and is baked for one and one-half hours longer and is finally ground to a slight bevel on the enameled edge just touching the edge of the lens.

A satisfactory baking oven for baking the enamel rim may be constructed with a frame 12 having electrical resistance 13 covered by an asbestos mat 14 upon which the lens with its unbaked rim is placed. Then a cover 15, which may be an ordinary detachable reflector for electric lamps, may be placed on the mat thus forming a chamber for inclosing a body of air around the lens or lenses being baked. The ventilating opening 16 of said chamber is thus formed by the opening in the reflector provided to receive the shank of an electric light bulb, to which said reflector in common practice is adapted. The rim of the reflector lies in one plane so as to fit closely upon the mat 14 to prevent air from flowing too freely to the lens.

When the baking has been completed it is found that the lens is provided with an integral strong light-intercepting rim, and in case the enamel, paint or pigment employed is of a metallic nature said rim is of a metallic nature, but in case the paint, enamel or pigments used are of a vitreous nature, said rim will be vitreous.

By this means I have produced an eyeglass or spectacle lens having an integral or vitreous enamel rim that is smooth and pleasing to the touch and to the sight.

The rough edge 2 backed with the enamel rim made integral or homogeneous therewith and containing metallic and vitreous material, is non-reflecting and the lens is darker at the periphery than at the center of the lens, so that there is no reflection of light into the eyeglass, from the inner face of the vitreous light-absorbing rim.

I do not wish it to be understood that I do confine my invention to the use of enamel only, as said rim for lenses may also be produced by fusing a glass edge around the same.

In the form shown in Figs. 2 and 3 the faces *a* of the lens form abrupt angles with the edge 2, both before and after the lens is finished.

In the form shown in Fig. 4 the edge of the eyeglass 1″ is beveled as at *b* and the surface of the non-transparent rim is tangent to the bevel faces.

In the form shown in Fig. 5 the edge 2″ of the eye-glass is beveled on both sides as at *b'*.

In each of the forms the eye-glass edge as 2, 2′ and 2″ is roughened to form a mat and the finished enamel rim *c* is integral with said mat.

Said mat is measurably non-light-refracting and non-light-reflecting in the finished lens; but may be made to transmit colored light.

In consequence of the matted lens edge and rim, the edge of the lens does not reflect light rays to the eye and the effect is pleasing and restful to the wearer.

I have thus produced a lens having a darker periphery than center having the center or inner portion in its original or natural condition, while said lens rim casts a restful and pleasing tint, shade or shadow over the entire lens.

This darker periphery may be applied to any kind of a lens and used lenses may also have these new enameled edges applied without impairing their usefulness whatsoever.

I claim:

1. The method substantially set forth of continuously applying and superposing layers of one or more pigments containing metallic material upon the periphery of a lens so that the layers form a homogeneous rim integral with the lens; and baking the lens until the rim assumes the proper consistency.

2. The method substantially set forth of continuously applying and superposing layers of enamel upon the periphery of a lens so that the layers form a homogeneous rim integral with the lens; and baking the lens until the rim assumes the proper consistency.

3. The method substantially set forth of continuously applying and superposing layers of enamel containing metallic material upon the periphery of a lens so that the layers form a homogeneous rim integral with the lens; and baking the lens until the rim assumes the proper consistency.

4. The method substantially set forth of continuously applying and superposing layers of vitreous material upon the periphery of a lens so that the layers form a homogeneous rim integral with the lens; and baking the lens until the rim assumes the proper consistency.

5. The method substantially set forth of continuously applying and superposing layers of non-transparent material upon the periphery of a lens so that the layers form a homogeneous rim integral with the lens; and baking the lens until the rim assumes the proper consistency.

6. The method substantially set forth of making a rim integral with a lens, consisting of revolving the lens peripherally in a lathe, applying continuous heat to the edge of the lens, applying liquid enamel or metallic salts to said edge in a continuous even flow, the speed of the lathe being so graduated that each peripheral application of the enamel is dried before the next is applied, thus building up rapidly, continuously and accurately a rim of any desired body or form; and baking the lens to vitrify the rim.

7. An integrally rimmed lens produced by the application to the edge of the lens of a continuous and repeated flow of liquid enamel or metallic salts under continuous heat during peripheral revolution of the lens in a lathe, each peripheral coating drying before the succeeding coat is applied, and baking of the same to vitrify the rim.

In testimony whereof, I have hereunto set my hand at Los Angeles, California, this 7th day of June, 1916.

GEORGE A. COLLINS.

Witness:
JAMES R. TOWNSEND.